United States Patent Office 3,520,855
Patented July 21, 1970

3,520,855
ACRYLONITRILE COPOLYMERS
Jenö Szita, Cologne-Worringen, and Heinrich Rinkler, Alfred Nogaj, Herbert Marzolph, and Günther Nischk, Dormagen, Germany, assignors to Farbenfabriken Bayer Aktiengesellschaft, Leverkusen, Germany, a corporation of Germany
No Drawing. Filed Jan. 26, 1968, Ser. No. 700,711
Claims priority, application Germany, Feb. 2, 1967,
F 51,419
Int. Cl. C08f *15/22;* C07c *69/54, 103/12*
U.S. Cl. 260—79.3     12 Claims

ABSTRACT OF THE DISCLOSURE

The invention relates to fibre-forming acrylonitrile copolymers having high affinity for acid dyes and to a process for their production by copolymerising at least 80% by weight of acrylonitrile together with 0.5 to 20% by weight of an unsaturated copolymerisable N,N-disubstituted oxalamide or a quaternisation product thereof.

---

This invention relates to fibre-forming acrylonitrile comoplymers with a high affinity for acid dyes and advantageous properties, and to a process for their production by copolymerising acrylonitrile with ethylenically unsaturated oxalamide hydrazides.

It is known that the affinity of acrylonitrile polymers for acid dyes can be increased by copolymerising comonomers containing basic groups, such as unsaturated tertiary or quaternary amines, preferably vinyl pyridines, and their alkyl-substituted derivatives. Copolymerisation is usually carried out in aqueous suspension. Unfortunately, it has not yet been possible in this way to find a satisfactory solution because the basic groups which are incorporated detrimentally affect to a considerable extent the thermal stability of the polyacrylonitrile. Fibres and filaments produced from such copolymers do not have the required high degree of whiteness and tend to discolour very appreciably under the influence of heat, Although it was possible to improve thermal stability by mixing together two polymers, only one of which contains the basic groups in correspondingly higher quantities, the process is complicated by additional steps whtich are not only expensive but technologically are difficult to control. Readily dyeable acrylonitrile/methyl vinyl pyridine copolymers can also be obtained by copolymerisation in dimethyl formamide solution. In this instance also, the textile properties and thermal stability of the spun filaments are far from satisfactory, whilst their tendency to discolour could once again only be prevented by mixing together two polymers which had to be purified beforehand by solution and reprecipitation.

It is also known that unsaturated semicarbazides and their quaternary salts can be copolymerised with acrylonitrile, giving temperature-resistant polymers showing a high affinity for acid and basic dyes. Copolymerisation with these monomers could only be carried out in aqueous media and not in the conventional organic solvents for polyacrylonitrile, for example dimethyl formamide. In the case of solution polymerisation in dimethyl formamide, the polymerisation reaction was disturbed by the comonomer, resulting in the formation of discoloured solutions.

When applying heat to the solutions (removal of the unreacted monomer residues by falling-film evaporation on dry-spinning) these showed a marked decrease in viscosity, due to degradation of the polymers formed, with the result that the solutions could not be spun by the dryspinning process. The spinning of extremely thin filaments (less than 3 den.) by the dry spinning process from the copolymers obtained by aqueous polymerisation also involved difficulties because the filaments had an inadequate tensile strength and could not be stretched.

It is an object of this invention, to provide fibre-forming acrylonitrile copolymers containing at least 80% by weight of copolymerised acrylonitrile and 0.5 to 20% by weight of a copolymerised N,N-disubstituted oxalamide hydrazide of the formula

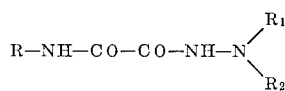

or a quaternised derivative of said N,N-disubstituted oxalamide hydrazide of the formula

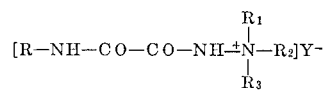

wherein $R_1$ and $R_2$ each represents an alkyl radical or $R_1$ and $R_2$ together with the nitrogen form a heterocyclic ring, $R_3$ represents a $C_1$ to $C_5$ alkyl radical, $Y^-$ represents an anion selected from the group consisting of a sulfate and a sulfonate and R represents an unsaturated radical of the formulae

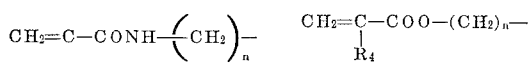

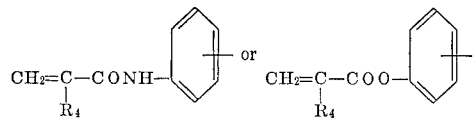

wherein $R_4$ represents hydrogen or a methyl group, whilst $n$ represents an integer from 1 to 4.

The acrylonitrile copolymers according to the invention are unusually heat stable, readily spinnable and show a high affinity for basic dyes.

It is another object of this invention, to provide a process for the production of acrylonitrile copolymers, which comprises copolymerising at least 80% by weight of acrylonitrile together with 0.5 to 20% by weight of an unsaturated copolymerisable N,N-disubstituted oxalamide hydrazide or a quaternisation product thereof, the balance being 2 to 12% by weight of a further comonomer, the percentages by weight being based on the total of monomers being used.

Examples for the readily copolymerisable N,N-disubstituted oxalamide hydrazide comonomers of the general formula

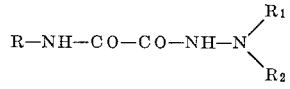

and the corresponding alkyl-quaternised derivatives of the formula

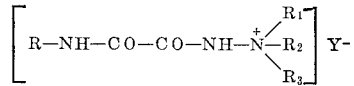

wherein R, $R_1$, $R_2$, $R_3$ and $Y^-$ have the meaning as given above, which are used as comonomers according to the invention are the following:

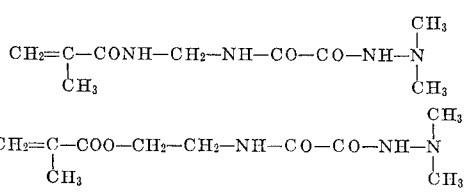

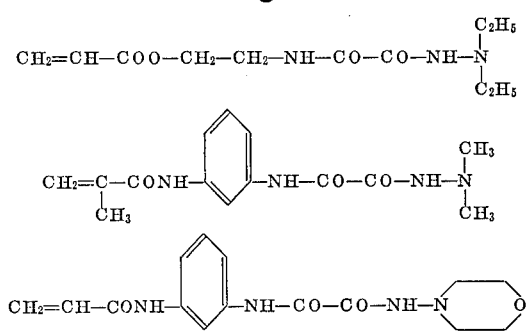

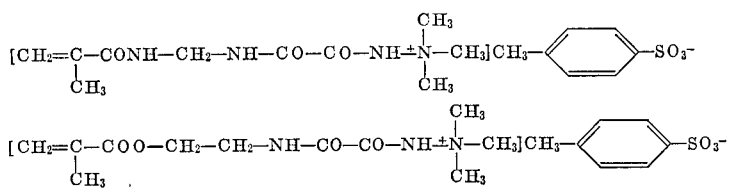

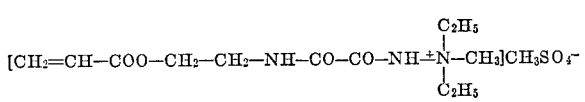

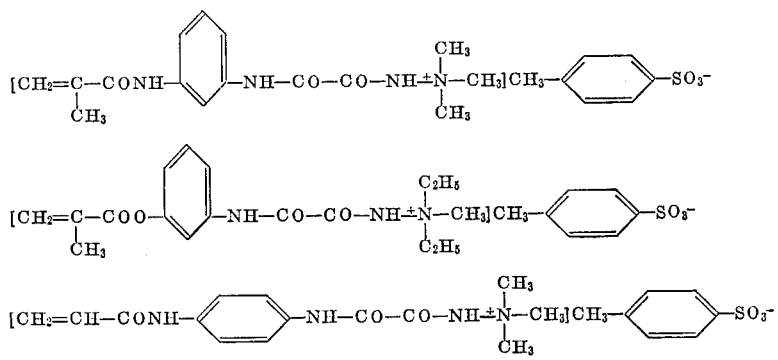

affinity for acid dyes. The lack of basicity in the functional groups also accounts for the other advantageous properties, such as the high level of polymerisability, the outstanding whiteness of the copolymers and their limited tendency to yellow. The comonomers according to the invention may readily be copolymerised with acrylonitrile, optionally together with other monomers, both in aqueous medium and in conventional organic solvents for polyacrylonitrile, at high polymerisation velocities and in high yields. While, thermally stable filaments with outstanding textile properties even when producing extremely low deniers, can be obtained by dry or wet spinning from spinning solutions prepared from the polymers or directly from the solutions obtained by solution polymerisation.

The effect of the novel comonomers which contains one particularly active functional group, is that the copolymers show a high level in all the properties required for the production of acrylic fibres, which they combine with all the advantages of conventional comonomers suitable for the production of polymers readily dyeable with acid dyes, and in addition show new advantageous properties.

The copolymers prepared in accordance with the invention contain at least 80% of acrylonitrile. The quantity in which the N,N-disubstituted oxalamide hydrazides are used as comonomers may be from 0.5 to 20%, although it is preferably from 5 to 12%. It is generally desirable for the copolymer to contain from 200 to 400 milliequivalents of dye-combining groups per kg. of polymer. The copolymerisation of acrylonitrile with the unsaturated oxalamide hydrazides is preferably carried out in the presence of additional neutral comonomers, for example acrylates and methacrylates, vinyl esters, styrene and its neutral derivatives, acrylamides or methacrylamides. They may be present in the polymer in quantities from 2 to 12%, preferably from 5 to 8%. The percentages by weight are based on the total amount of monomers used.

These comonomers may be prepared in accordance with the process described by the applicants in an earlier application, for example by reacting diethyl oxalate with an aminophenol to form the corresponding amide ester which is then further reacted with an N,N-dialkyl hydrazine. The hydroxyl group of the resulting hydroxyphenyl oxamido-N,N-dimethylhydrazide is esterified with acrylic or methacrylic acid chloride. It is also possible to react an amino alcohol with acrylic or methacrylic acid chloride and to prepare the comonomers from this compound by further reaction with oxalic acid ethylene ester-N,N-dimethyl hydrazide. Nitrophenyl oxalamide diethyl ester may be catalytically reduced to form the corresponding aminophenyl compound, the resulting compound reacted with N,N-dimethylhydrazine and the hydrazide reacted with acrylic or methacrylic chloride.

The unsaturated N,N-disubstituted oxalamide hydrazides may be quaternised with organic esters of inorganic or organic acids, for example dimethyl sulfate or methyl toluene sulfonate.

The comonomers are readily soluble both in water and in polar organic solvents such as dimethyl formamide, dimethyl acetamide, dimethyl sulfoxide or ethylene glycol carbonate. The aqueous solutions of the non-quaternised derivatives are weakly acid, whilst those of the quaternised products are strongly acid. It was therefore surprising that these comonomers, or the functional groups incorporated, should impart to the polymer such a high In aqueous medium, polymerisation is carried out at pH values of below 7, either continuously or batchwise. The pH value is adjusted by strong mineral acids, for example sulfuric acid or phosphoric acid, or by organic sulfonic acids, for example toluene sulfonic acid. The pH value is preferably from 1.5 to 4. When the strongly acid quaternary salts are copolymerised, polymerisation may even be carried out in the absence of acid. The amount of water added is usually from 5 to 10 times the quantity in which the monomers are used. The reaction temperature is in the range from 30 to 70° C. and preferably in the range from 40 to 55° C. Suitable polymerisation catalysts include compounds which are able to form reactive radicals, for example azo compounds or organic or inorganic peroxidic compounds. It is preferred, however, to use redox systems and in particular those based on peroxidic compounds and compounds of sulfur in a low stage of oxidation. The water-soluble salts of persulfuric acid, for example sodium, potassium or ammonium persulfate are preferably used as the peroxidic compounds in the redox system, whilst sodium or potassium hydrogen sulfite or pyrosulfite is used as the reduction component. The catalysts are used in such a quantity that the polymer has a K-value of from 75 to 90 (according to Fikentscher, Cellulosechemie 13, p. 58, 1932). The catalysts are generally used in quantities from 0.5 to 3% by weight, based on the total weight of the monomers used. In order to regulate the grain size in which the polymers are formed (and hence, for example, filterability or drying), small quantities of emulsifiers, wetting agents or special electrolytes may be used. It is advantageous to flush the polymerisation vessels with nitrogen, for example before the beginning of the reaction, and to avoid the presence of atmospheric oxygen during the reaction.

The polymers prepared by the process according to the invention precipitate from the reaction medium in the form of fine, readily filterable grains, usually even in the absence of grain regulators. Readily soluble fine powders are formed from them, providing drying is carried out in a stream of heated air at 150 to 180° C. Such polymers can be converted very easily into highly concentrated, readily spinnable solutions in the usual solvents for polyacrylonitrile, for example, dimethyl formamide, dimethyl acetamide, dimethyl sulfoxide or ethylene glycol carbonate.

With solution polymerisation, conventional solvents for polyacrylonitrile may be used as the reaction medium. Of the usual organic solvents, dimethyl formamide or dimethyl sulfoxide are preferably used. The concentration in which the monomers are initially present in the reaction mixture is such that, on completion of polymerisation, clear, non-cloudy solutions are formed which can still be conveyed through pipes at temperatures in the range of 35 to 40° C. In the process according to the present invention, the total monomer concentration is from 20 to 40% by weight, depending both upon the comonomer component and upon the solvent. To initiate polymerisation, soluble radical-forming catalysts, for example azoisobutyronitrile, ammonium persulfate, organic hydroperoxides keto peroxides, acyl peroxides or peresters may be used in the solvent employed. It is preferred to use redox systems consisting of the aforementioned organic peroxides and of reducing compounds, for example derivatives of sulfinic acid, sulfinamides in particular. The quantity in which the catalysts are used is governed both by the other reaction conditions and by the required molecular weight. As a rule, they are used in quantities from 0.5 to 3% by weight. It is usually of advantage for the reaction mixture to contain from 0.05 to 1.0% by weight of a strong acid, such as sulfuric acid or an aromatic sulfonic acid, and/or from 0.5 to 2% by weight of water. The polymerisation temperature may be in a range from 0 to 80° C. depending upon the type of catalyst used, although polymerisation is preferably carried out at a temperature from 25 to 60°. Polymerisation may be carried out either continuously or batchwise in conventional reaction vessels, preferably in the absence of oxygen. After the required conversion rate or polymer concentration has been reached, the reaction is stopped. The highly viscous solutions formed are either colourless or very slightly yellow, clear and gel-free, so that they can be further processed without any difficulty. They may be spun by dry or wet spinning processes into fibres or filaments of any customary denier, either directly or following removal of the unreacted volatile monomers, for example under reduced pressure in a falling film evaporator.

Percentages quoted in the specification and in the following example are percentages by weight, based on the total quantity, unless otherwise stated.

The following example is to further illustrate the invention.

EXAMPLE 1

Polymerisation in aqueous medium is carried out as follows:

88 litres of desalted water are poured into an enameled 150-litre-capacity vessel equipped with stirring mechanism, thermometer, reflux condenser and nitrogen inlet, and heated to about 55° C. by means of a heating circuit. The air is then displaced from the vessel with nitrogen and the monomers: 6.54 kg. of acrylonitrile, 460 g. of methyl acrylate and 690 g. of the compound

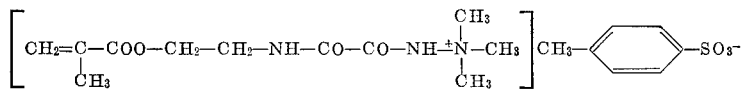

are dissolved in the desalted water. 52 g. of potassium persulfate and 36 g. of sodium pyrosulfite, each dissolved in 500 ml. of water, are then added and the pH value of the reaction medium is adjusted to 2 by means of 20% by weight toluene sulfonic acid solution. The reaction mixture is stirred for 5 hours at 50° C. under an inert gas pressure (nitrogen). The resulting fine-grained pure white polymer is separated and washed out in a filter centrifuge. 6.5 kg. of polymer (85% yield) with a K-value of 84.4, are obtained drying in vacuo at 50–55° C. Analysis showed that the copolymer obtained contains 6.3% of methyl acrylate and 203 milliequivalents of quaternised oxamide hydrazide groups per kg.

Preparation of the compound

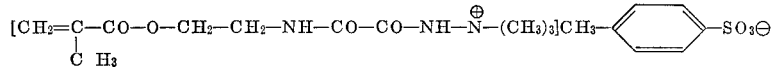

165 parts by weight of the compound

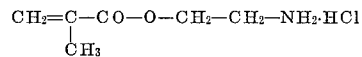

and 160 parts by weight of the compound

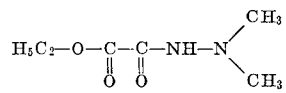

are dissolved in 1000 parts by weight of methanol. 40 parts by weight of NaOH, dissolved in 200 parts by weight of methanol, are added dropwise at room temperature. The reaction mixture is stirred another 6 to 8 hours at 30 to 50° C., the sodium chloride, which precipitates, is filtered off and the filtrate is evacuated nearly to dryness.

The compound

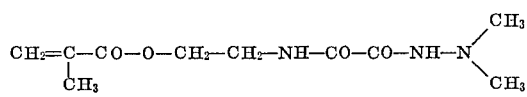

precipitates and is filtered off.

Yield 220 parts by weight, melting point 90–92° C.
243 parts by weight of the compound

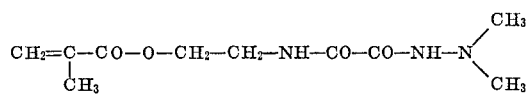

are dissolved in 1500 parts by weight of acetone and stabilized by addition of 1 part by weight of phenothiazine. 204 parts by weight of methyl-p-toluene, dissolved in 300 parts by weight of acetone, sulfonate are added dropwise at room temperature. The reaction mixture is stirred for 12 to 16 hours. The quarternized product of the formula

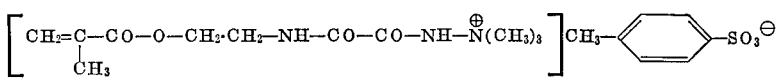

precipitates in crystalline form and can be filtered off.

Yield 330 parts by weight.
Melting point 130–132° C.

What we claim is:

1. A fibre-forming acrylonitrile copolymer containing at least 80% by weight of copolymerised acrylonitrile and 0.5 to 20% by weight of a copolymerised N,N-disubstituted oxalamide hydrazide of the formula

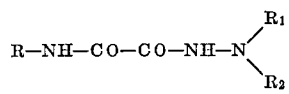

or a quaternised derivative of said N,N-disubstituted oxalamide hydrazide of the formula

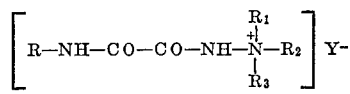

wherein $R_1$ and $R_2$ each represents an alkyl radical or $R_1$ and $R_2$ together with the nitrogen form a heterocyclic ring, $R_3$ represents a $C_1$ to $C_5$ alkyl radical, $Y^-$ represents an anion selected from the group consisting of a sulfate and a sulfonate and R represents an unsaturated radical of the formulae

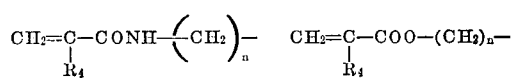

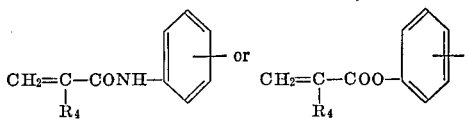

wherein $R_4$ represents hydrogen or a methyl group, whilst $n$ represents an integer from 1 to 4.

2. The copolymer of claim 1 wherein said N,N-disubstituted oxalamide hydrazide has the formula:

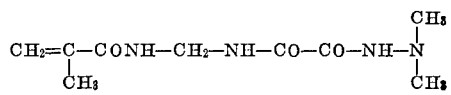

3. The copolymer of claim 1 wherein said N,N-disubstituted oxalamide hydrazide has the formula:

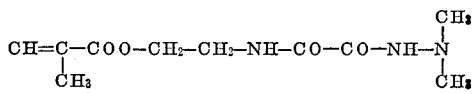

4. The copolymer of claim 1 wherein said N,N-disubstituted oxalamide hydrazide has the formula:

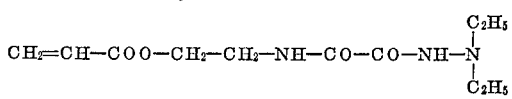

5. The copolymer of claim 1 wherein said N,N-disubstituted oxalamide hydrazide has the formula:

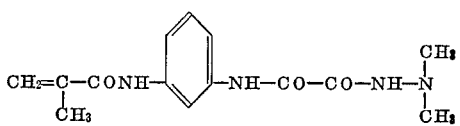

6. The copolymer of claim 1 wherein said N,N-disubstituted oxalamide hydrazide has the formula:

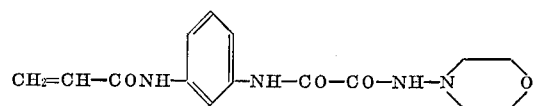

7. The copolymer of claim 1 wherein the quaternized derivative of said N,N-disubstituted oxalamide hydrazide has the formula:

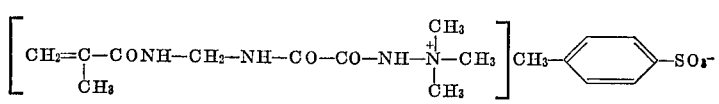

8. The copolymer of claim 1 wherein the quaternized derivative of said N,N-disubstituted oxalamide hydrazide has the formula:

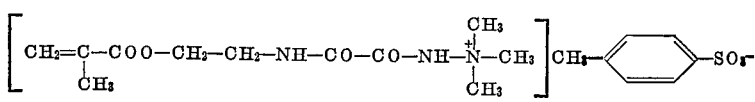

9. The copolymer of claim 1 wherein the quaternized derivative of said N,N-disubstituted oxalamide hydrazide has the formula,

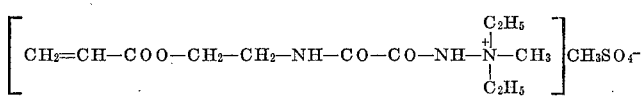

10. The copolymer of claim 1 wherein the quaternized derivative of said N,N-disubstituted oxalamide hydrazide has the formula:

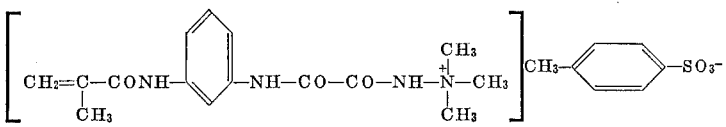

11. The copolymer of claim 1 wherein the quaternized derivative of said N,N-disubstituted oxalamide hydrazide has the formula:

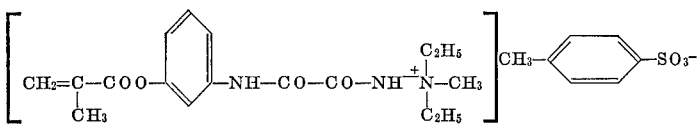

12. The copolymer of claim 1 wherein the quaternized derivative of said N,N-disubstituted oxalamide hydrazide has the formula:

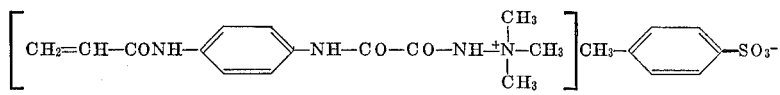

References Cited
UNITED STATES PATENTS

| | | | |
|---|---|---|---|
| 3,408,338 | 10/1968 | Szita | 260—79.3 |
| 3,412,077 | 11/1968 | Szita | 260—79.3 |

JOSEPH L. SCHUTER, Primary Examiner

C. A. HENDERSON, Jr., Assistant Examiner

U.S. Cl. X.R.

260—486, 551, 247, 85.5

UNITED STATES PATENT OFFICE
CERTIFICATE OF CORRECTION

Patent No. 3,520,855      Dated July 21, 1970

Inventor(s) Jenö Szita et al.

It is certified that error appears in the above-identified patent and that said Letters Patent are hereby corrected as shown below:

Column 1, line 25, "comoplymers" should read -- copolymers --. Column 2, line 25, first formula $$CH_2=C- \quad \text{should read} \quad CH_2=C-\underset{R_4}{|}$$

Column 6, line 53, the formula should appear as shown below:

Signed and sealed this 10th day of November 1970.

(SEAL)
Attest:

EDWARD M. FLETCHER, JR.
Attesting Officer

WILLIAM E. SCHUYLER, JR.
Commissioner of Patents